(12) United States Patent
Osawa et al.

(10) Patent No.: US 11,683,726 B2
(45) Date of Patent: Jun. 20, 2023

(54) COMMUNICATION DEVICE

(71) Applicant: NTT DOCOMO, INC., Tokyo (JP)

(72) Inventors: Ryosuke Osawa, Tokyo (JP); Kazuaki Takeda, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 183 days.

(21) Appl. No.: 17/255,495

(22) PCT Filed: Jun. 29, 2018

(86) PCT No.: PCT/JP2018/024926
§ 371 (c)(1),
(2) Date: Dec. 23, 2020

(87) PCT Pub. No.: WO2020/003531
PCT Pub. Date: Jan. 2, 2020

(65) Prior Publication Data
US 2021/0377806 A1     Dec. 2, 2021

(51) Int. Cl.
*H04W 28/18* (2009.01)
*H04W 76/14* (2018.01)
*H04W 4/40* (2018.01)
*H04W 72/20* (2023.01)

(52) U.S. Cl.
CPC ............ *H04W 28/18* (2013.01); *H04W 4/40* (2018.02); *H04W 72/20* (2023.01); *H04W 76/14* (2018.02)

(58) Field of Classification Search
CPC ............ H04L 1/0001; H04W 4/40–48; H04W 28/18–22; H04W 72/1284; H04W 76/14; H04W 92/18; H04W 8/005; H04W 8/20; H04W 72/1278–1294; H04W 74/002; H04W 84/18; H04W 88/04; H04W 4/46; H04W 72/20
See application file for complete search history.

(56) References Cited

U.S. PATENT DOCUMENTS 9,813,938 B2 * 11/2017 Merlin .............. H04W 28/0268
2016/0050698 A1   2/2016 Siomina

FOREIGN PATENT DOCUMENTS

| JP | 2018-102011 A | 6/2018 |
| WO | 2017/209005 A1 | 12/2017 |

OTHER PUBLICATIONS

"Definition of Generate," Merriam-Webster as of Feb. 14, 2018, accessed via Archive.org, https://web.archive.org/web/20180214200237/https://www.merriam-webster.com/dictionary/generate, pp. 1-11, accessed Dec. 21, 2022, pp. 1-11. (Year: 2022).*

(Continued)

*Primary Examiner* — Thomas R Cairns
(74) *Attorney, Agent, or Firm* — Osha Bergman Watanabe & Burton LLP

(57) ABSTRACT

A communication device includes a receiving unit that receives information indicating a first set of combinations of radio parameters; a control unit that extracts, based on the first set of the combinations of the radio parameters and a second set of combinations of radio parameters supported by the communication device, a third set of combinations of radio parameters that are common between the first set and the second set; and a transmitting unit that transmits information indicating the third set of the combinations of the radio parameters.

4 Claims, 12 Drawing Sheets

(56) References Cited

OTHER PUBLICATIONS

"Definition of Extract," Merriam-Webster as of Dec. 7, 2017, accessed via Archive.org, https://web.archive.org/web/20171207152027/https://www.merriam-webster.com/dictionary/extract, pp. 1-16, accessed Dec. 21, 2022. (Year: 2022).*
International Search Report issued in Application No. PCT/JP2018/024926, dated Jul. 31, 2018 (5 pages).
3GPP TS 38.213 V15.1.0, Release 15; "3rd Generation Partnership Project; Technical Specification Group Radio Access Network; NR; Physical layer procedures for control;" Mar. 2018; Sophia Valbonne, France (77 pages).
3GPP TS 38.211 V15.1.0, Release 15; "3rd Generation Partnership Project; Technical Specification Group Radio Access Network; NR; Physical channels and modulation;" Mar. 2018; Sophia Antipolis Valbonne, France (90 pages).
3GPP TSG RAN Meeting #80; RP-181429; "New SID: Study on NR V2X;" Vodafone; Jun. 11-14, 2018; La Jolla, USA (5 pages).
Office Action issued in Japanese Application No. 2020-527160; dated Apr. 19, 2022 (5 pages).
Extended European Search Report issued in European Application No. 18924289.4, dated Jan. 7, 2022 (8 pages).

* cited by examiner

SELECT RADIO RESOURCE FROM SYNCHRONIZED COMMON TIME/FREQUENCY GRID

Typical long-PUCCH format

Typical short-PUCCH format

FIG.11

| Combination# | Numerology | BWP | Slot length |
|---|---|---|---|
| #0 | SCS=15 kHz | 10 RB | 14 symbol |
| #1 | SCS=15 kHz | 100 RB | 14 symbol |
| #2 | SCS=30 kHz | 250 RB | 7 symbol |
| #3 | SCS=30 kHz | 250 RB | 14 symbol |

FIG.12

| Numerology | BWP | Slot length |
|---|---|---|
| #0 | #0 | #1 |

COMMUNICATION DEVICE

TECHNICAL FIELD

The present invention relates to a communication device in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which communication devices such as UEs perform communication directly with each other without going through a base station (for example, Non-Patent Document 1).

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.213 V15.1.0 (2018-03)
Non-Patent Document 2: 3GPP TS 38.211 V15.1.0 (2018-03)
Non-Patent Document 3: 3GPP TSG RAN Meeting #80, PR-181429, La Jolla, USA, Jun. 11 to 14, 2018

SUMMARY OF THE INVENTION

Problem to be Solved by the Invention

In uplink and downlink of a cellular communication, since a communication counterpart of a communication device is only a base station, a communication device can uniformly determine a combination of radio parameters. In sidelink communication, since the combination of radio parameters such as a numerology, a bandwidth part, a slot length, and the like that can be supported by the communication counterpart is different, if the combination of the radio parameters such as the numerology, the bandwidth part, the slot length, and the like is uniformly configured at the time of transmission and reception, a user equipment that is unable to support the configured combination of the radio parameters is unlikely to be able to perform communication.

There is a need for a method of selecting a combination of radio parameters that can be supported by both a transmission destination and a reception destination that perform communication via sidelink.

Means for Solving the Problem

According to an aspect of the present invention, there is provided a communication device including a receiving unit that receives information indicating a first set of combinations of radio parameters; a control unit that extracts, based on the first set of the combinations of the radio parameters and a second set of combinations of radio parameters supported by the communication device, a third set of combinations of radio parameters that are common between the first set and the second set; and a transmitting unit that transmits information indicating the third set of the combinations of the radio parameters.

Advantage of the Invention

According to the technology of the disclosure, a method of selecting a combination of radio parameters that can be supported by both a transmission destination and a reception destination that perform communication via sidelink is provided.

BRIEF DESCRIPTION OF DRAWINGS

FIG. 11 is a diagram illustrating an example of allocating an index to a combination of radio parameters;
FIG. 12 is a diagram illustrating another example of allocating an index to a combination of radio parameters.

EMBODIMENTS OF THE INVENTION

Hereinafter, embodiments of the present invention are described with reference to the appended drawings. The embodiments described below are an example, and embodiments to which the present invention is applied are not limited to the following embodiments.

In the embodiments, it is assumed that a direct communication scheme between communication devices is sidelink (SL) of LTE or NR, but the direct communication scheme is not limited to this scheme. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signal (PSSS/SSSS) used for synchronization.

For example, in UL, a reference signal of an antenna port X is used as the reference signal to be referred to so as to determine the path loss in the transmission power control, and in SL (including UL used as SL), a reference signal of an antenna port Y is used as the reference signal to be referred to so as to determine the path loss in the transmission power control.

Furthermore, in the embodiments, a configuration in which a communication device is installed in a vehicle is mainly assumed, but an embodiment of the present invention is not limited to this configuration. For example, a communication device may be a terminal carried by a person, a communication device may be a drone or a device installed in an aircraft, and a communication device may be a base station, an RSU, a relay station, or the like as well.

(Overview of Sidelink)

In the embodiments, since sidelink is the basic technique used, first, an overview of sidelink is described as a basic example. An example of a technique described here is a technique specified in Rel. 14 of 3GPP or the like. This technique may be used in NR, or a technique different from this technique may be used in in NR.

Figure 1:
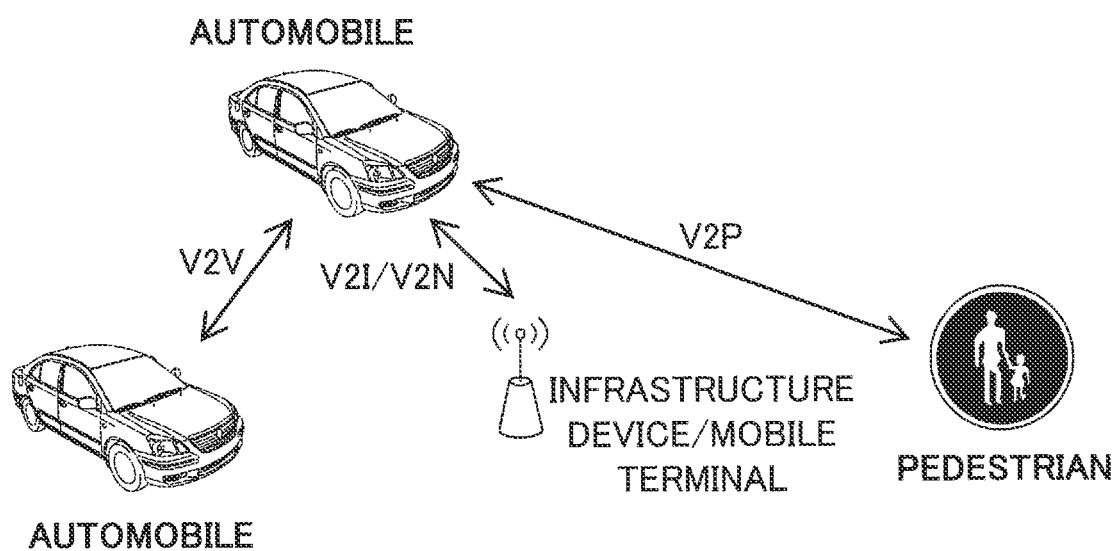
FIG. 1 is a diagram for illustrating V2X.
Figure 2A:
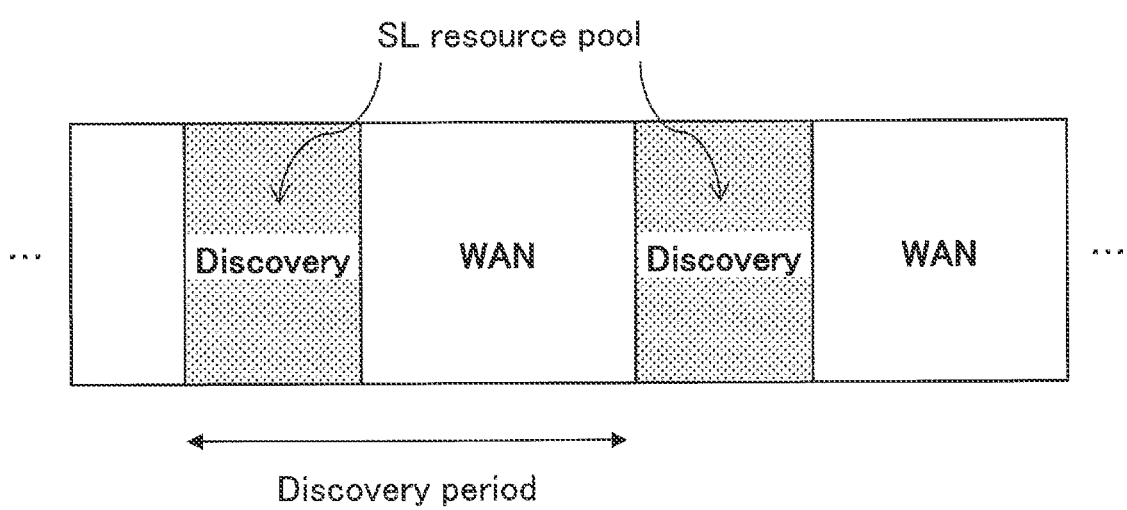
FIG. 2A is a diagram for illustrating sidelink.

Sidelink is roughly divided into "discovery" and "communication." For "discovery," as illustrated in FIG. 2A, a discovery message resource pool is configured for each discovery period, and a communication device (referred to as a UE) transmits a discovery message (discovery signal) within the resource pool. More specifically, there are Type 1 and Type 2b. In Type 1, a communication device autonomously selects a transmission resource from the resource pool. In Type 2b, a quasi-static resource is allocated by higher layer signaling (for example, an RRC signal).

Figure 2B:
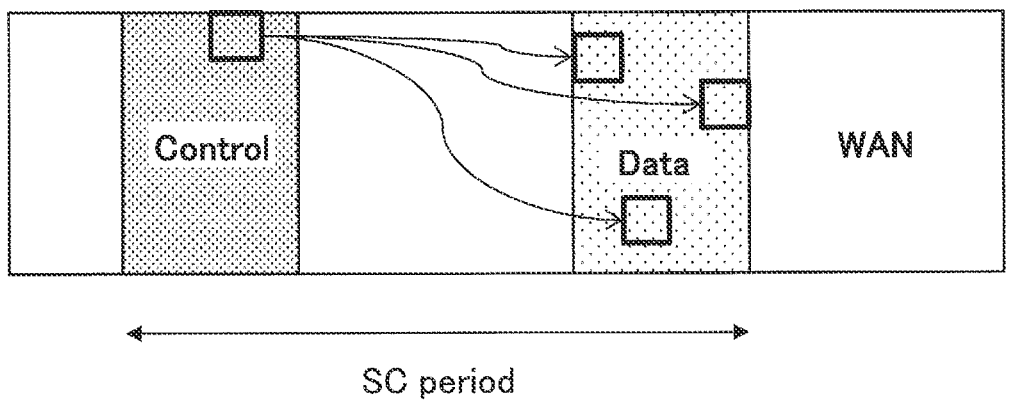
FIG. 2B is a diagram for illustrating sidelink.

For "communication," as illustrated in FIG. 2B, a sidelink control information (SCI)/data transmission resource pool is periodically configured. A communication device on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a communication device. In the mode 2, a communication device autonomously selects a transmission resource from the resource pool. For example, the resource pool is notified of through SIB, for example, and is predefined.

In Rel-14, in addition to the mode 1 and the mode 2, there are a mode 3 and a mode 4. In Rel-14, SCI and data can be transmitted simultaneously (in one subframe) with resource blocks that are adjacent in a frequency direction. The SCI is also referred to as a scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted.

Figure 3:
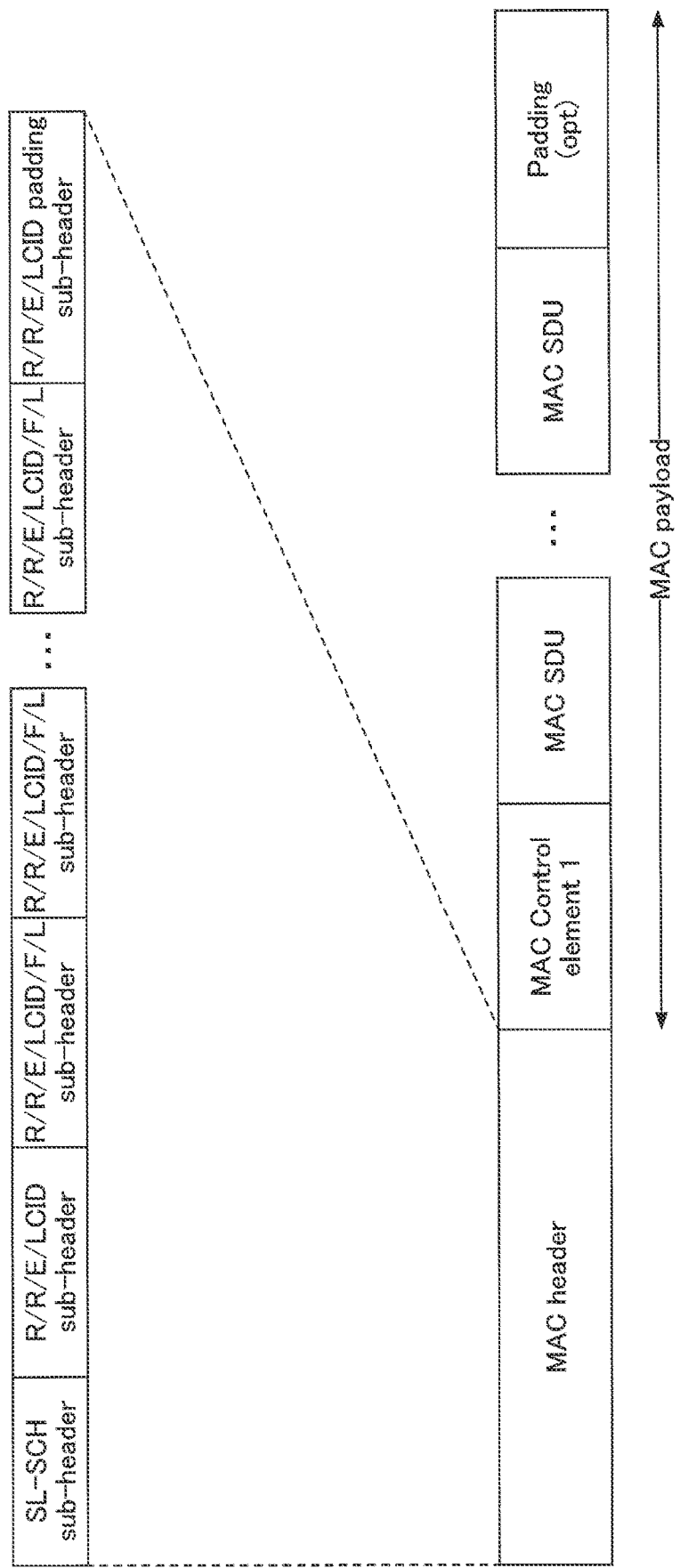
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
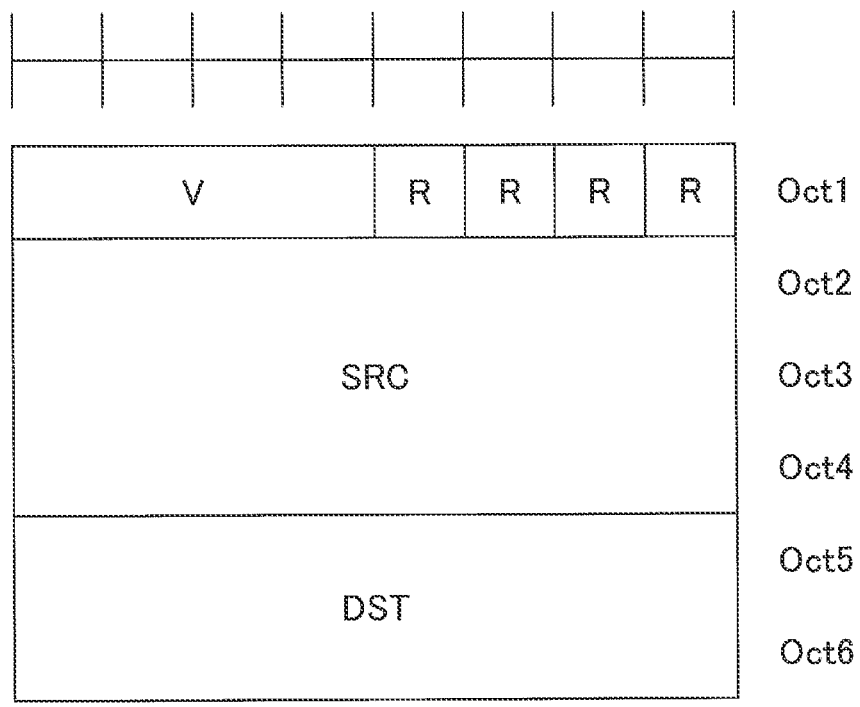
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the communication device. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
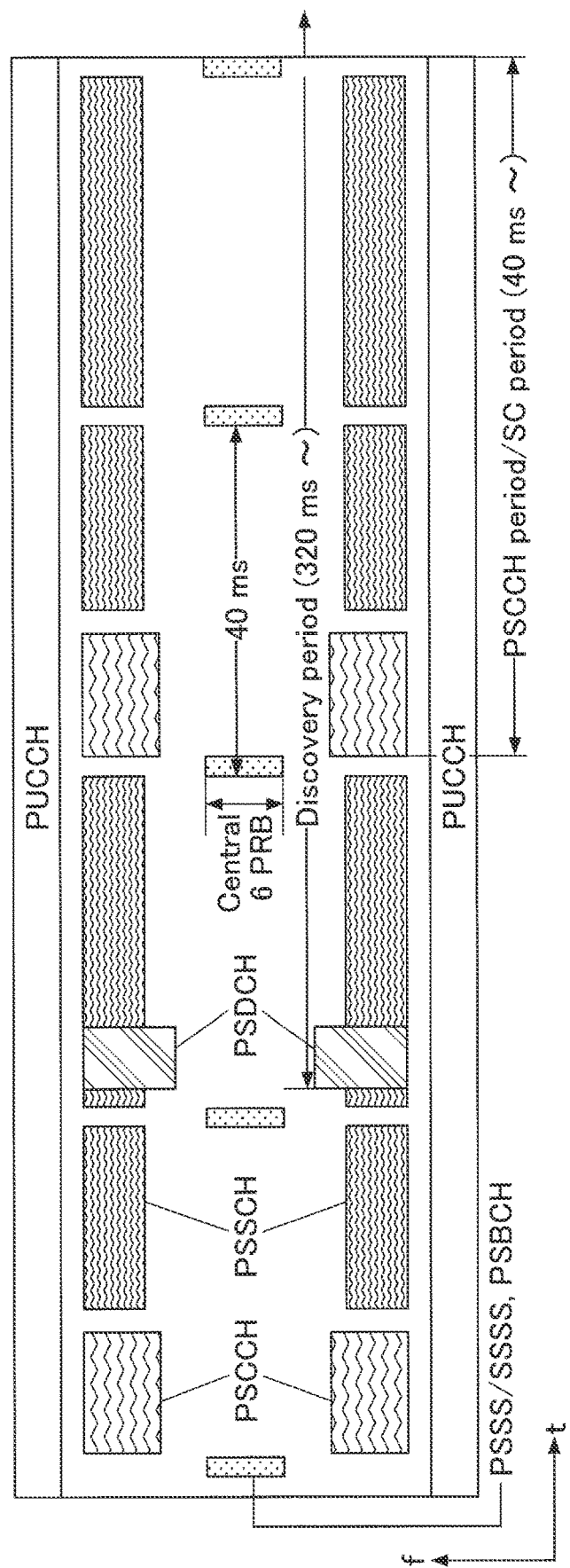
FIG. 5 is a diagram for illustrating an example of a channel structure used in sidelink.

An example of a channel structure of sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication."

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a scheme related to "communication." However, in the embodiments, there may be no distinction between "communication" and "discovery." Furthermore, the technology according to the embodiments may be applied in "discovery."

(System Configuration)

Figure 6:
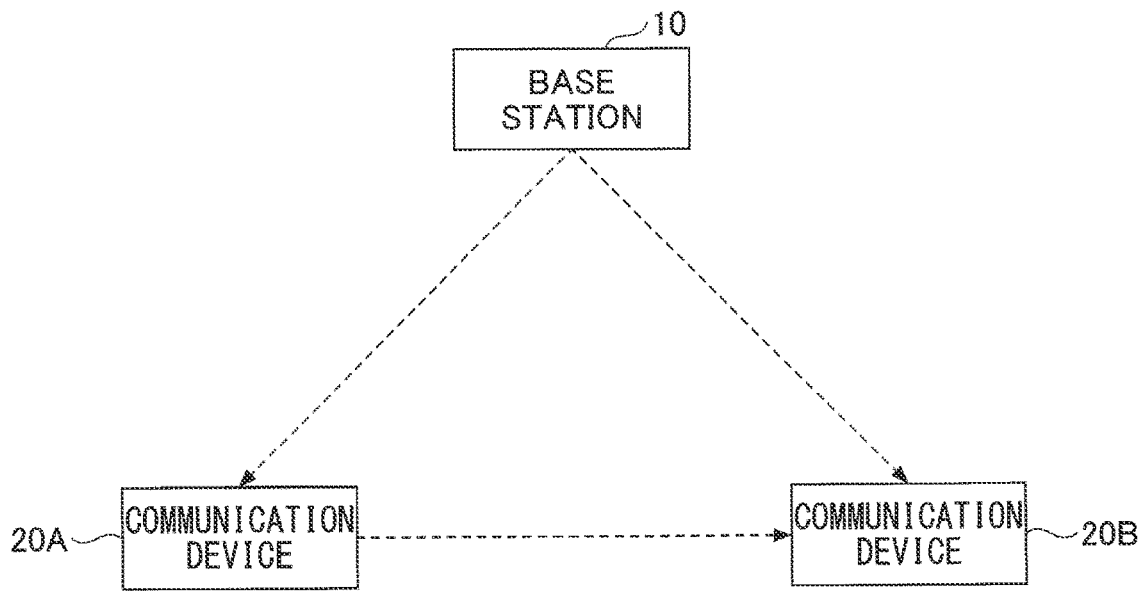
FIG. 6 is a diagram indicating a configuration example of a radio communication system according to an embodiment.

FIG. 6 is a diagram illustrating a configuration example of a radio communication system according to the embodiments. As illustrated in FIG. 6, the radio communication system according to the embodiments includes a base station 10, a communication device 20A, and a communication device 20B. Note that, actually, there may be many communication devices, but FIG. 6 illustrates the communication device 20A and the communication device 20B as an example.

In FIG. 6, it is intended that the communication device 20A is the transmission side, the communication device 20B is the reception side, but both the communication device 20A and the communication device 20B have both the transmission function and the reception function. Hereinafter, when it is not necessary to particularly distinguish the communication devices 20A and 20B, the are referred to simply as a "communication device 20" or a "communication device." FIG. 6 illustrates a case in which the communication device 20A and the communication device 20B are both in the coverage as an example, but an operation according to the embodiments can be applied to a case in which all the communication devices 20 are within the coverage, a case in which some communication devices 20 are within the coverage, and the other communication devices 20 are outside the coverage, and a case in which all the communication devices 20 are outside the coverage.

In the embodiments, the communication device 20 is a device installed in a vehicle such as, for example, an automobile and has a cellular communication function as a UE in LTE or NR and a sidelink function. Furthermore, the communication device 20 has a function of acquiring report information (position, event information, or the like) as in a GPS device, a camera, or various types of sensors. Furthermore, the communication device 20 may be a general mobile terminal (such as a smartphone). Furthermore, the communication device 20 may be an RSU. The RSU may be a UE type RSU having a function of a UE, a gNB type RSU (which is also referred to as a gNB type UE) having a function of a base station, or a relay station.

The communication device 20 need not be a device of one housing, and for example, even when various types of sensors are distributed and arranged in a vehicle, a device including various types of sensors is the communication device 20. Furthermore, the communication device 20 may have a function of performing transmission and reception of data with various types of sensors without including various types of sensors.

Furthermore, processing content of sidelink transmission of the communication device 20 is basically similar to processing content of UL transmission in LTE or NR. For example, the communication device 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, a complex-valued time-domain CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the communication device 20 in the embodiments. Furthermore, the base station 10 may be an RSU (a gNB type RSU) or a relay station.

Furthermore, in the radio communication system according to the embodiments, a signal waveform used for SL or UL by the communication device 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. A time length other than a sub frame may be used as the transmission time interval. Furthermore, the number of slots per sub frame may be determined in accordance with the subcarrier spacing. Furthermore, the number of symbols per slot may be 14 symbols.

In the embodiments, the communication device 20 can operate in any mode among a mode 1 which is a mode in which resources are dynamically allocated by the ((enhanced) physical downlink control channel ((E) PDCCH) transmitted from the base station 10 to the communication device, a mode 2 which is a mode in which the communication device autonomously selects a transmission resource from a resource pool, a mode in which resource for SL signal transmission is autonomously selected (hereinafter referred to as a mode 4), and a mode in which resource for SL signal transmission is allocated from the base station 10 (hereinafter referred to as a mode 3). The mode is configured, for example, in the communication device 20 from the base station 10.

Figure 7:
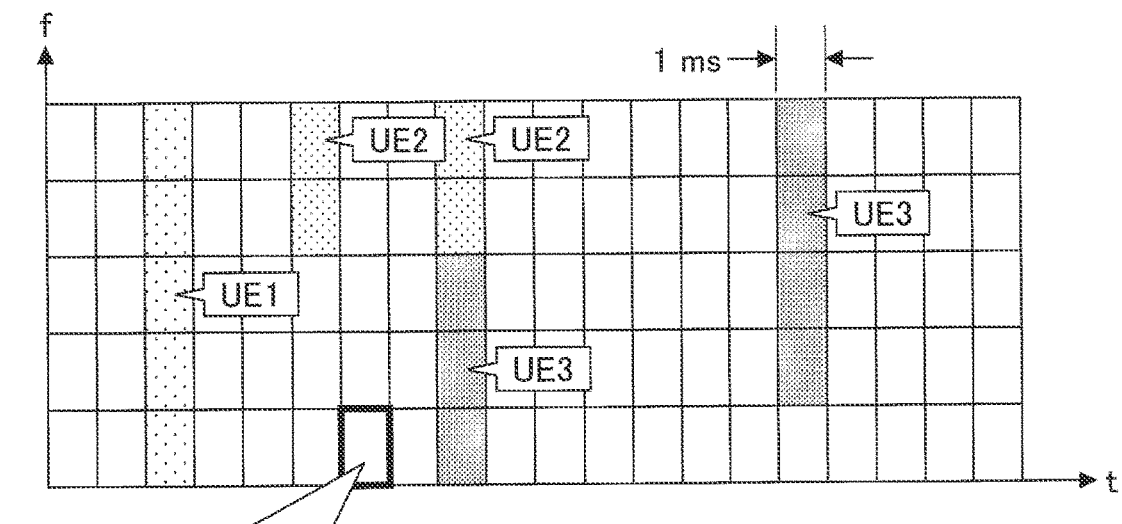
FIG. 7 is a diagram for illustrating a resource selection operation of a communication device.

As illustrated in FIG. 7, the communication device of the mode 4 (indicated by a UE in FIG. 7) selects a radio resource from a synchronized common time/frequency grid. For example, the communication device 20 performs sensing in the background, specifies resources which have a good sensing result and are not reserved for other communication devices as candidate resources, and selects a resource to be used for transmission from the candidate resources.

In Release 15 NR of 3GPP, a bandwidth part operation of dynamically switching a bandwidth in which a terminal performs transmission and reception is specified (Non-Patent Document 1). The bandwidth part refers to a subset of adjacent common resource blocks.

In downlink, a maximum of four bandwidth parts can be configured for a user equipment (UE). In this case, a single downlink bandwidth part is activated at each time. The UE receives a physical downlink shared channel (PDSCH), a PDCCH, or a channel state information reference signal (CSI-RS) within an activated bandwidth part. In other words, it is assumed that the PDSCH, the PDCCH, and the CSI-RS are not transmitted outside the bandwidth part (Non-Patent Document 2).

Furthermore, in uplink, a maximum of four bandwidth parts can be configured for the UE. In this case, a single uplink bandwidth part is activated at each time. In a case in which supplementary uplink (SUL) is configured for the UE, a maximum of four bandwidth parts can be added to the UE in supplementary uplink. In this case, a single additional uplink bandwidth part is activated at each time. The UE does not transmit the PUSCH and the PUCCH outside the activated bandwidth part. In other words, the UE transmits the PUSCH or the PUCCH within the activated bandwidth part.

Figure 8:
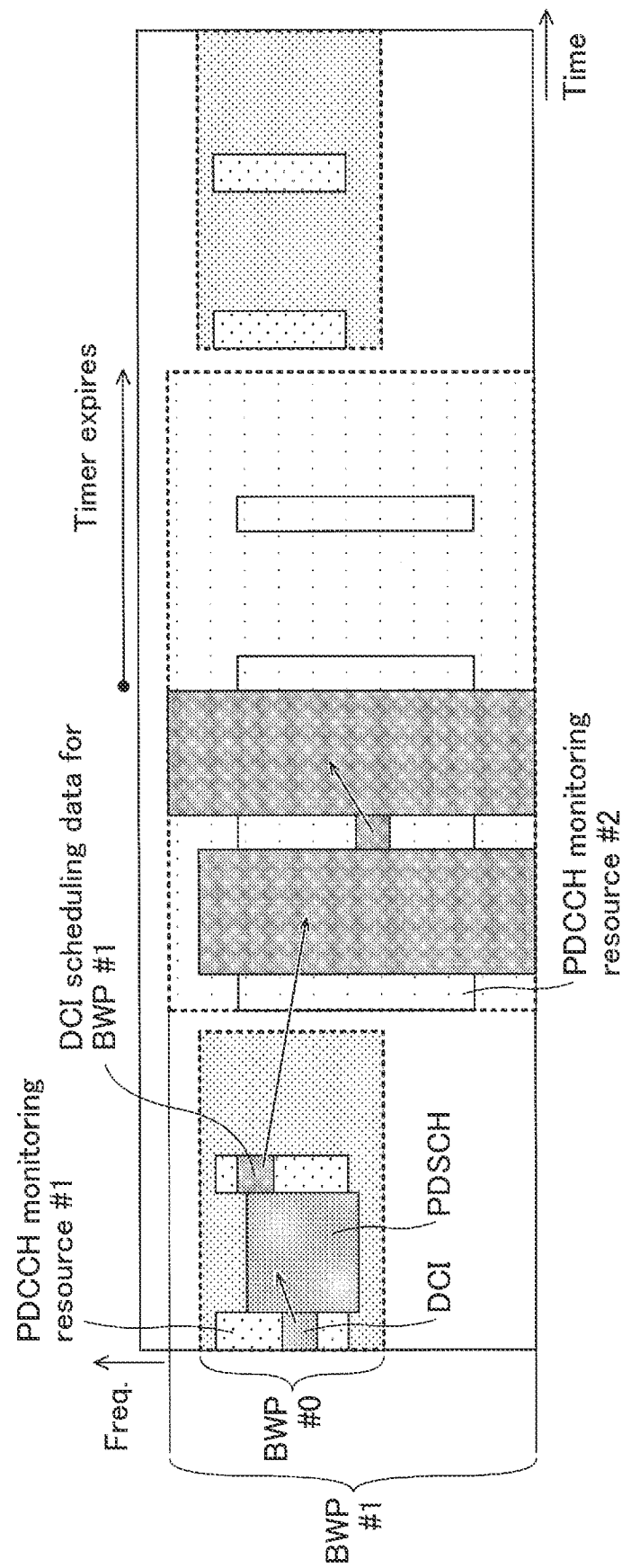
FIG. 8 is a diagram for illustrating an example of a bandwidth part operation.

An example of the bandwidth part operation is illustrated in FIG. 8. For example, at the time of initial-access, the UE recognizes only a minimum bandwidth (BW) necessary for the initial access and communicates with the base station in the minimum bandwidth. For example, in the example of FIG. 8, the UE communicates with the base station via a bandwidth part (BWP) #0.

Thereafter, the UE monitors the PDCCH and receives downlink control information (DCI) transmitted from the base station via the PDCCH. At this time, the DCI includes an index designating the bandwidth part. For example, in the example illustrated in FIG. 8, the DCI includes an index specifying the BWP #1. In response to the received DCI, the UE activates the BWP #1 and communicates with the base station via BWP #1 at a reception timing indicated by the received DCI.

A timer is used to deactivate the activated BWP. In the example of FIG. 8, the BWP #1 is deactivated when the timer expires, and the BWP #0 which is a default bandwidth part is activated at a next reception timing.

As described above, according to the bandwidth part operation in NR specified in Release 15 of 3GPP, communication by a UE operable with a bandwidth narrower than a maximum bandwidth specified in a system can be supported. The bandwidth part operation in this case is specified for uplink communication and downlink communication between a base station and a user equipment.

Currently, in 3GPP, a technical specification of Release 16 has been developed. The application of the bandwidth part operation to sidelink has been discussed, and the bandwidth part even in sidelink can be specified.

A sidelink design of NR is included in a Study Item of V2X of Release 16 of 3GPP (Non-Patent Document 3). Accordingly, in addition to the bandwidth part, a technique which is newly introduced to DL/UL of NR of Release 15 of 3GPP is assumed to be applied to sidelink. In the following, an overview of multi-numerology and dynamic TDD is described, as an example of a technique which is newly introduced to DL/UL of 3GPP Release 15 NR.

<Multi-Numerology>

In order to support a wide frequency and a use case in 5G, it is necessary to support a plurality of numerologies (radio parameters such as subcarrier spacing and a symbol length). For this reason, it is effective to design variable parameters to be scalable, using the LTE numerology as a reference. Under this concept, multi-numerology of NR has been introduced. Specifically, reference subcarrier spacing is the same as the subcarrier spacing of LTE, and is assumed to be 15 kHz. By multiplying the reference subcarrier spacing by a power of 2, other subcarrier spacings are specified.

According to Non-Patent Document 2, a plurality of OFDM numerologies, that is, subcarrier spacing configurations p are specified. Specifically, subcarrier spacings $\Delta f=15$ kHz, 30 kHz, 60 kHz, 120 kHz, and 240 kHz are specified for $\mu=0, 1, 2, 3$, and 4.

Here, according to Table 4.3.2-1 of Non-Patent Document 2, the number of OFDM symbols included in one slot is 14 for any of the subcarrier spacing configurations $\mu=0, 1, 2, 3$, and 4. However, for the subcarrier spacing configurations $\mu=0, 1, 2, 3$, and 4, the number of slots included in one frame is 10, 20, 40, 80, and 160, and the number of slots included in one sub frame are 1, 2, 4, 8, and 16. Here, since a frame length is 10 ms, it is understood that a slot length is 1 ms, 0.5 ms, 0.25 ms, 0.125 ms, and 0.0625 ms for the subcarrier spacing configurations $\mu=0, 1, 2, 3$, and 4. Since the number of OFDM symbols included in one slot is 14 for any of the subcarrier spacing configurations $\mu=0, 1, 2, 3$, and 4, it is understood that the OFDM symbol length differs for each subcarrier spacing configuration. For the subcarrier spacing configuration $\mu=0, 1, 2, 3$, and 4, the OFDM symbol length is (1/14) ms, (0.5/14) ms, (0.25/14) ms, (0.125/14) ms, and (0.0625/14) ms. By reducing the slot length and the OFDM symbol length as described above, low delay communication can be realized.

<Dynamic TDD>

Similar to LTE, in NR, both frequency division duplex (FDD) and time division duplex (TDD) are supported. In particular, in TDD, dynamic TDD (flexible duplex) in which a communication direction (UL/DL) is dynamically switched in the time domain (or the frequency domain) for efficient traffic accommodation is supported.

In TDD of LTE, a communication direction is configured by a UL/DL configuration in a static/semi-static manner. In contrast, in TDD of NR, a communication direction is dynamically switched depending on a traffic state in a cell.

In Table 4.3.2-3 of Non-Patent Document 2, various slot formats are specified. According to Non-Patent Document 2, OFDM symbols in one slot are classified into downlink (written as D in Table 4.3.2-3), flexible (written as X in Table 4.3.2-3), or uplink (written as U in Table 4.3.2-3). As illustrated in Table 4.3.2-3, in the slot format of NR, allocation of DL and UL is performed in units of symbols.

In contrast, in the case of LTE, allocation of DL and UL is performed in units of sub frames.

By the signaling of allocation information for allocating any one slot format illustrated in Table 4.3.2-3 to each of a plurality of slots included in a frame, dynamic TDD (flexible TDD) can be achieved in which the communication direction (UL/DL) is dynamically switched in the time domain (or the frequency domain).

Figure 9:
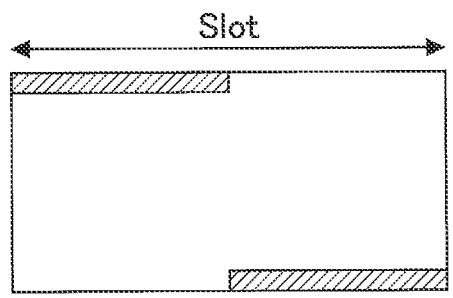
FIG. 9 is a diagram illustrating an example of a long-PUCCH format and a short-PUCCH format.
Figure 9:
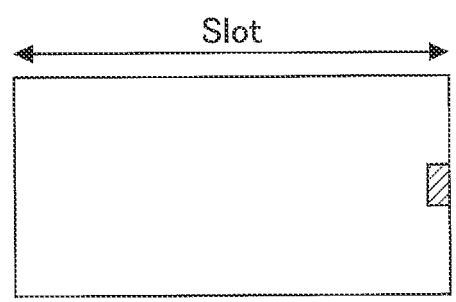

In addition to the above-described technique, for example, as illustrated in FIG. 9, a short-PUCCH format and a long-PUCCH format have been introduced for 3GPP Release 15 UL.

In sidelink communication, since the combination of radio parameters, such as the numerology, the bandwidth part, and the slot length, that can be supported by the communication counterpart is different, if the combination of the radio parameters, such as the numerology, the bandwidth part, and the slot length, is uniformly configured at the time of transmission and reception, a user equipment that is unable to support the configured combination of the radio parameters is unlikely to be able to perform communication.

The above problem can be solved by sharing information of the combination of radio parameters that can be supported between a transmission destination and a reception destination which perform communication in sidelink and selecting a combination of radio parameters that can be supported by both the transmission destination and the reception destination. Specific examples of a solution method are described below.

First, as an assumption for describing the specific examples, it is assumed that the communication device 20A and the communication device 20B can communicate with each other by sidelink. Furthermore, as an assumption for describing the specific examples, it is assumed that the communication device 20A transmits data to the communication device 20B through one or more of a physical sidelink broadcast channel (PSBCH), a physical sidelink control channel (PSCCH), and a physical sidelink shared channel (PSSCH). Furthermore, in the following Examples 1 and 2, a combination of radio parameters notified between the communication device 20A and the communication device 20B include a numerology, a bandwidth part, a slot length, a physical resource block (PRB) location, a subcarrier spacing, a cyclic prefix, and the like. Furthermore, in Example 3, a combination of radio parameters notified between the communication device 20A and the base station 10, between the communication device 20B and the base station 10, and between the communication device 20A and the communication device 20B is considered to include the numerology, the bandwidth part, the slot length, the PRB location, the subcarrier spacing, the cyclic prefix, and the like. However, the notified combination of the radio parameters is not limited to these parameters, and other radio parameters (for example, a modulation and coding scheme (MCS)) may be included.

Example 1

Figure 10:
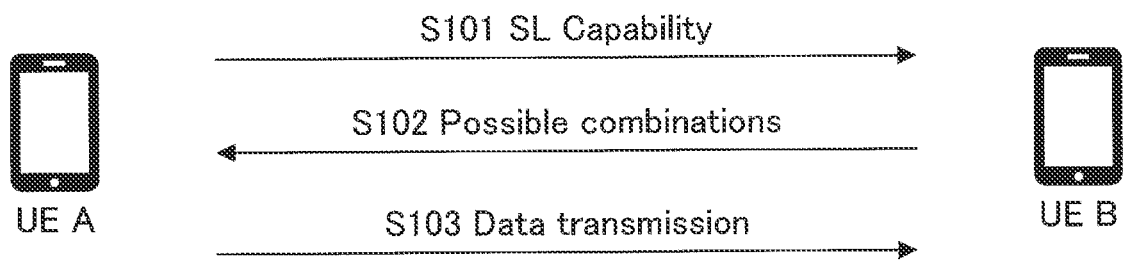
FIG. 10 is a diagram for illustrating an operation example 1.

As illustrated in FIG. 10, the communication device 20A gives a notification indicating one or more combinations of radio parameters such as the numerology, the bandwidth part, the slot length, the PRB location, the subcarrier spacing, and the cyclic prefix which can be supported by the communication device 20A to the communication device 20B by sidelink (step S101). The communication device 20B selects one or more combinations of radio parameters such as the numerology, the bandwidth part, and the slot length which are considered to be able to be used for communication with the communication device 20A among one or more combinations of radio parameters such as the numerology, the bandwidth part, and the slot length which can be supported by the communication device 20B from one or more combinations of radio parameters such as the numerology, the bandwidth part, and the slot length received from the communication device 20A, and gives a notification indicating one or more selected combinations of radio parameters to the communication device 20A (S102). The communication device 20A selects one combination of radio parameters from among one or more combinations of radio parameters such as the numerology, the bandwidth part, and the slot length received from the communication device 20B, and applies the selected combination of the radio parameters to the transmission of data to the communication device 20B (S103).

The details of the procedure illustrated in FIG. 10 are described below. Here, the combination of radio parameters such as the numerology, the bandwidth part, and the slot length which a terminal can support in sidelink communication may be referred to as an SL capability of the terminal. Here, "SL" indicates that the SL capability is a capability exchanged between terminals related to sidelink communication of a UE unlike usual UE capability.

In step S101, when the communication device 20A notifies the communication device 20B of one or more combinations of radio parameters such as the numerology, the bandwidth part, and the slot length which can be supported by the communication device 20A by sidelink, the communication device 20A and the communication device 20B do not recognize the SL capability of each other. Accordingly, when one or more combinations of radio parameters such as the numerology, the bandwidth part, and the slot length are transmitted in step S101, the communication device 20A can use a default combination of radio parameters such as the numerology, the bandwidth part, and the slot length (a default format and a default parameter).

The default combination of the radio parameters may be indicated from the base station (it may be assumed to be indicated from the base station). The base station may notify the communication device 20A of the default combination of the radio parameters through a DL signal (which may be any one of a physical layer signal, a MAC layer signal, and an RRC layer signal) transmitted through any one of a physical broadcast channel (PBCH), a physical downlink control channel (PDSCH), and a physical downlink shared channel (PDSCH) or a combination thereof. Alternatively, the default combination of the radio parameters may be specified by the specification.

Furthermore, in step S101, when the communication device 20A communicates one or more combinations of radio parameters such as the numerology, the bandwidth part, and the slot length which can be supported by the communication device 20A to the communication device 20B by sidelink, the communication device 20A may notify the communication device 20B of one or more combinations of radio parameters by transmitting a sidelink signal (which may be any one of a physical layer signal, a MAC layer signal, and an RRC layer signal) transmitted through any one of a physical sidelink broadcast channel (PSBCH), a physical sidelink control channel (PSCCH), and a physical sidelink shared channel (PSSCH) or a combination thereof.

In response to reception of one or more combinations of radio parameters transmitted by the communication device 20A in step S101, the communication device 20B compares one or more combinations of radio parameters which can be supported by the communication device 20A with one or more combinations of radio parameters which can be supported by the communication device 20B, and extracts one or more combinations of radio parameters that can be used for communication with the communication device 20A. For example, the communication device 20B may compare one or more combinations of radio parameters transmitted by the communication device 20A with one or more combinations of radio parameters which can be supported by the communication device 20B and extract one or more combinations of common radio parameters. At this time, when priority is determined for one or more combinations of radio parameters, extraction may be performed in order from a combination of radio parameters having the highest priority to a combination of radio parameters having an N-th priority (N is greater than or equal to 1). For example, when it is necessary to reduce latency in sidelink communication, the priority may be determined for one or more combinations of radio parameters in the ascending order of an amount of latency. In other words, the highest priority may be allocated to a combination of radio parameters with the smallest amount of latency. As another example, when it is necessary to increase the throughput in sidelink communication, the priority may be determined for one or more combinations of radio parameters in the descending order of the throughputs. In other words, the highest priority may be allocated to a combination of radio parameters with the highest throughput. Here, a combination of radio parameters such as the numerology, the bandwidth part, and the slot length applied in the communication device 20A when the communication device 20A transmits data to the communication device 20B may be different from a combination of radio parameters such as the numerology, the bandwidth part, and the slot length applied in the communication device 20A when the communication device 20A receives data from the communication device 20B.

In step S102, the communication device 20B transmits one or more extracted combinations of the radio parameters to the communication device 20A. Furthermore, when the communication device 20A notifies the communication device 20B (or the communication device 20B notifies the communication device 20A) of one or more combinations of radio parameters such as the numerology, the bandwidth part, and the slot length by sidelink, an index may be allocated to each of one or more combinations of radio parameters, and one or more indexes may be transmitted as information indicating one or more combinations of radio parameters.

FIG. 11 is a diagram illustrating an example of allocating such an index. As illustrated in FIG. 11, an index (combination #) #1 may be allocated to a combination of radio parameters with a subcarrier spacing of 15 kHz, a bandwidth part of 100 RB, and a slot length of 14 symbols. As another example, as illustrated in FIG. 12, an index may be allocated to each item in a combination of radio parameters. For example, FIG. 12 illustrates a combination of radio parameters indicated by a combination #0 in FIG. 11.

Since an index is allocated to a combination of radio parameters or an index is allocated to each item in a combination of radio parameters as described above, the overhead, when one or more combinations of radio parameters such as the numerology, the bandwidth part, and the slot length is notified of by sidelink, can be reduced.

In step S103, the communication device 20A selects one or more combinations from one or more combinations of radio parameters notified from the communication device 20B in step S102, and applies the selected combinations to data transmission from the communication device 20A to the communication device 20B. Here, particularly, as a case in which a plurality of combinations of radio parameters notified from the communication device 20B are selected, for example, a case in which, when the communication device 20A communicates with the communication device 20B using a plurality of component carriers (CCs), a combination of radio parameters such as a different numerology, a different bandwidth part, and a different slot length is applied for each component carrier is considered. For example, the communication device 20A may include the information indicating a combinations of one or more radio parameters selected from one or more combinations of radio parameters received from the communication device 20B in sidelink control information (SCI), transmit the resulting SCI to the communication device 20B through the PSCCH, and apply the combination of one or more radio parameters to data communication performed through the PSSCH from the communication device 20A to the communication device 20B. As another example, the communication device 20A need not notify the communication device 20B of a combination of radio parameters selected by the communication device 20A in step S103. In this case, the communication device 20B may attempt to receive data transmitted from the communication device 20A by blindly applying each of one or more combinations of radio parameters notified to the communication device 20A in step S102 at the time of reception.

Example 2

Figure 13:
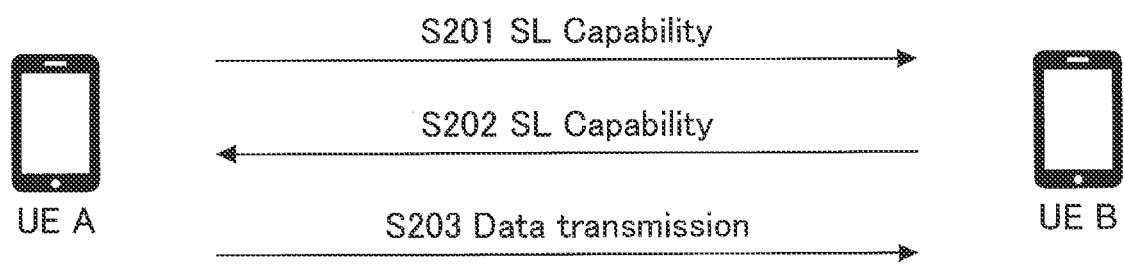
FIG. 13 is a diagram for illustrating an operation example 2.

Next, another example of the method of solving the above-described problem is described with reference to FIG. 13. The communication device 20A notifies the communication device 20B of one or more combinations of radio parameters such as the numerology, the bandwidth part, the slot length, the physical resource block (PRB) location, the subcarrier spacing, and the cyclic prefix which can be supported by the communication device 20A by sidelink (step S201). Then, the communication device 20B notifies the communication device 20B of one or more combinations of radio parameters such as the numerology, the bandwidth part, and the slot length which can be supported by the communication device 20B (step S202). Here, step S201 and step S202 are in no particular order. Furthermore, step S201 can be omitted. The communication device 20A selects a combination of one or more radio parameters from among one or more combinations of radio parameters such as the numerology, the bandwidth part, and the slot length received from the communication device 20B, and applies the selected combination of one or more radio parameters to signal transmission to the communication device 20B performed through any one or more of the PSBCH, the PSCCH, and PSSCH (S203). For example, the communication device 20A may include information indicating a combination of one or more radio parameters selected from one or more combinations of radio parameters received from the communication device 20B in the sidelink control information (SCI), transmit the resulting SCI to the communication device 20B through the PSCCH, and apply the combination of the one or more radio parameters to data communication performed through the PSSCH from the communication device 20A to the communication device 20B. As another example, the communication device 20A need not notify the communication device 20B of the combination of the radio parameters selected by the communication device 20A in step S203. In this case, the communication device 20B may attempt to receive data transmitted from the communication device 20A by blindly applying each of one or more combinations of radio parameters notified to the communication device 20A in step S102 at the time of reception.

Here, in the example illustrated in FIG. 10, in step S102, the communication device 20B performs a narrowing-down operation of selecting one or more combinations of radio parameters which can be supported by the communication device 20B from one or more combinations of radio parameters notified from the communication device 20A and notifies the communication device 20A of one or more narrowed-down combinations of radio parameters. However, in the example illustrated in FIG. 13, in step S202, the communication device 20B simply notifies the communication device 20A of one or more combinations of radio parameters which can be supported by the communication device 20B without performing such a narrowing-down operation.

In this example, a combination of radio parameters such as the numerology, the bandwidth part, and the slot length applied in the communication device 20A when the communication device 20A transmits data to the communication device 20B may be different from a combination of radio parameters such as the numerology, the bandwidth part, and the slot length applied in the communication device 20A when the communication device 20A receives data from the communication device 20B.

Furthermore, when the communication device 20A notifies the communication device 20B (or the communication device 20B notifies the communication device 20A) of one or more combinations of radio parameters such as the numerology, the bandwidth part, and the slot length by sidelink, one or more indexes may be allocated to each of one or more combinations of radio parameters, and one or more indexes may be transmitted as information indicating one or more combinations of radio parameters.

Example 3

Figure 14:
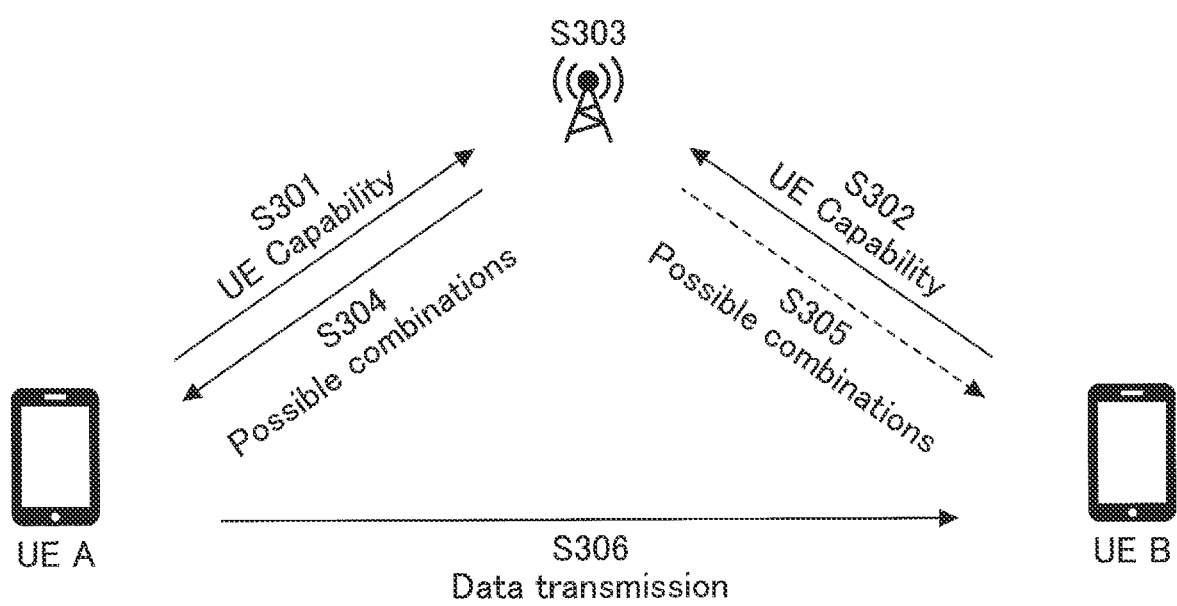
FIG. 14 is a diagram for illustrating an operation example 3.

Next, another example of a method of solving the above-described problem is described with reference to FIG. 14. In this example, the base station 10 determines a combination of radio parameters to be applied to sidelink communication.

First, in step S301, the communication device 20A notifies the base station 10 of one or more combinations of radio parameters such as the numerology, the bandwidth part, the slot length, the physical resource block (PRB) location, the subcarrier spacing, and the cyclic prefix by uplink that can be supported by the communication device 20A. In step S302, the communication device 20B notifies the base station 10 of one or more combinations of radio parameters such as the numerology, the bandwidth part, and the slot length which can be supported by the communication device 20B. Here, step S301 and step S302 are in no particular order. In step S303, the base station 10 extracts one or more combinations of radio parameters applicable to both the communication device 20A and the communication device 20B among one or more combinations of radio parameters transmitted from the communication device 20A and the communication device 20B. In step S304, the base station 10 notifies the communication device 20A of one or more combinations of radio parameters extracted in step S303. In step S305, the base station 10 notifies the communication device 20B of one or more combinations of radio parameters extracted in step S303. Here, step S304 and step S305 are in no particular order, and step S305 can be omitted. In step S306, the communication device 20A selects one or more combinations from one or more combinations of radio parameters notified from the base station 10 in step S304, and applies the selected combination of the radio parameters to transmission of an SL signal performed through one or more of the PSBCH, the PSCCH, and the PSSCH.

The communication device 20A may notify the communication device 20B of one or more combinations of radio parameters applied to the transmission of the SL signal in step S306 through an SL signal (which may be any one of a physical layer signal, a MAC layer signal, and an RRC layer signal) transmitted through any one of the PSBCH, the PSCCH, the PSSCH, and the PSDCH or a combination thereof. Alternatively, the communication device 20A need not notify the communication device 20B of one or more combinations of radio parameters applied to the transmission of the SL signal in step S306. In this case, the communication device 20B may receive the data transmitted from the communication device 20A by blindly applying one or more combinations of radio parameters notified in step S305.

The notification of one or more combinations of radio parameters in step S301 and step S302 may be performed through a UL signal (which may be any one of a physical layer signal, a MAC layer signal, and an RRC layer signal) transmitted through any one of a physical uplink control channel (PUCCH) and a physical uplink shared channel (PUSCH) or a combination thereof.

In step S303, the base station 10 compares one or more combinations of radio parameters which can be supported by the communication device 20A with one or more combinations of radio parameters which can be supported by the communication device 20B, and extracts one or more combinations of radio parameters which can be used for communication between the communication device 20A and the communication device 20B. For example, the base station 10 may compare one or more combinations of radio parameters transmitted by the communication device 20A with one or more combinations of radio parameters which can be supported by the communication device 20B and extract one or more combinations of common radio parameters. At this time, when a priority is determined for one or more combinations of radio parameters, extraction may be performed in order from a combination of radio parameters having the highest priority to a combination of radio parameters having an N-th priority (N is greater than or equal to 1). For example, when it is necessary to reduce latency in sidelink communication, the priority may be determined for one or more combinations of radio parameters in the ascending order of an amount of latency. In other words, the highest priority may be allocated to a combination of radio parameters with the smallest amount of latency.

Here, a combination of radio parameters such as the numerology, the bandwidth part, and the slot length applied in the communication device 20A when the communication device 20A transmits data to the communication device 20B may be different from a combination of radio parameters such as the numerology, the bandwidth part, and the slot length applied in the communication device 20A when the communication device 20A receives data from the communication device 20B.

(Device Configuration)

Next, a functional configuration example of each of the base station 10 and the communication device 20 that execute the processes and the operation described so far is described.

<Base Station 10>

Figure 15:
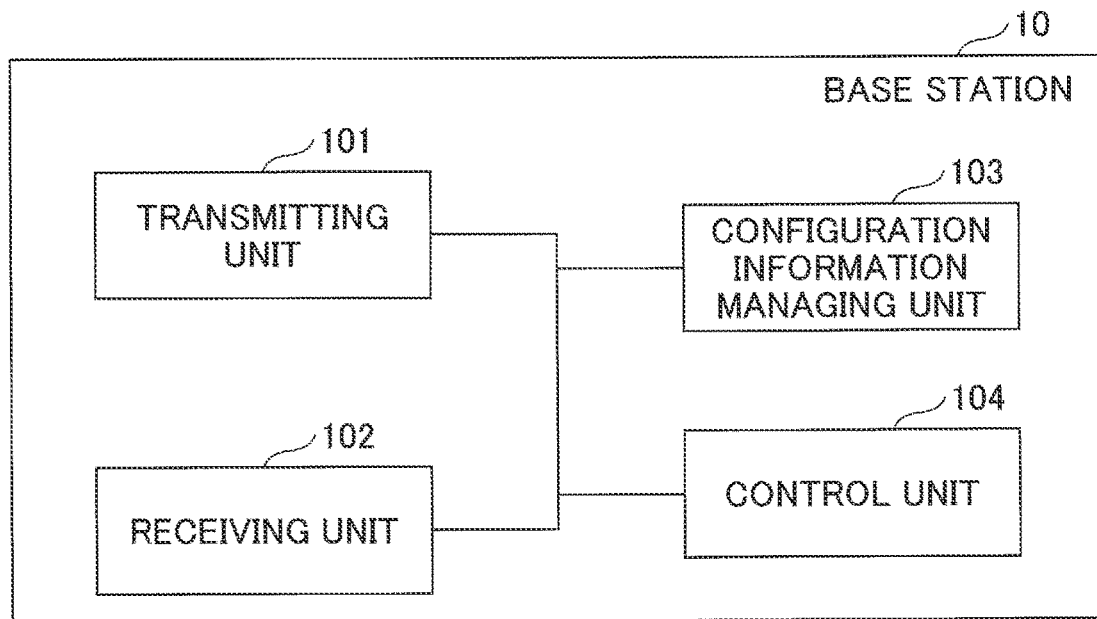
FIG. 15 is a diagram indicating an example of a functional configuration of a base station 10 according to an embodiment.

FIG. 15 is a diagram illustrating an example of a functional configuration of the base station 10. As illustrated in FIG. 15, the base station 10 includes a transmitting unit 101, a receiving unit 102, a configuration information managing unit 103, and a control unit 104. The functional configuration illustrated in FIG. 11 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the communication device 20 side and transmitting the signal wirelessly. The receiving unit 102 has a function of receiving various types signals transmitted from the communication device 20 and acquiring, for example, information of an upper layer from the received signals. Furthermore, the receiving unit 102 has a function of measuring the received signal and acquiring a quality value.

The configuration information managing unit 103 stores pre-configured configuration information, configuration information received from the communication device 20, and the like. Furthermore, configuration information related to transmission may be stored in the transmitting unit 101, and configuration information related to reception may be stored in the receiving unit 102. The control unit 104 controls the base station 10. The function of the control unit 104 related to transmission may be included in the transmitting unit 101, and the function of the control unit 104 related to reception may be included in the receiving unit 102.

For example, in association with the operation described with reference to FIG. 14, the receiving unit 102 transmits one or more combinations of radio parameters that are transmitted from the communication device 20A and can be supported by the communication device 20A and one or more combinations of radio parameters which are transmitted from the communication device 20B and can be supported by the communication device 20B. The control unit 104 compares one or more combinations of radio parameters that can be supported by the communication device 20A and one or more combinations of radio parameters that can be supported by the communication device 20B and extracts one or more combinations of radio parameters that can be used for communication between the communication device 20A and the communication device 20B. The control unit 104 generates information indicating one or more extracted combinations of radio parameters, and the transmitting unit 101 transmits a signal including the generated information to the communication device 20A and the communication device 20B.

<Communication Device 20>

Figure 16:
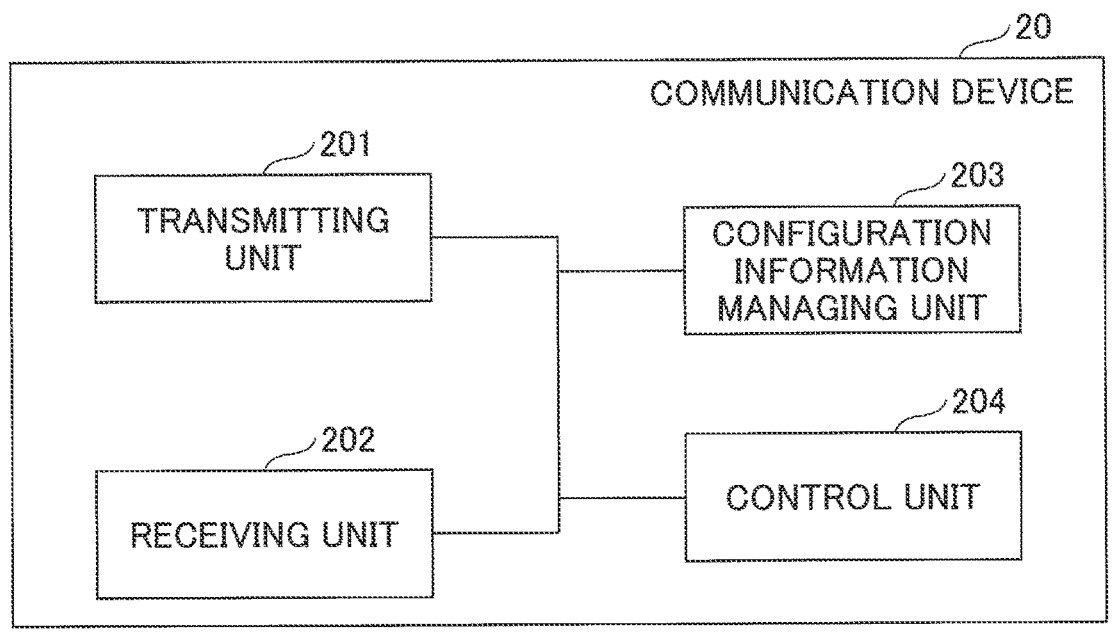
FIG. 16 is a diagram indicating an example of a functional configuration of a communication device 20 according to an embodiment.

FIG. 16 is a diagram illustrating an example of a functional configuration of the communication device 20. As illustrated in FIG. 16, the communication device 20 includes a transmitting unit 201, a receiving unit 202, a configuration information managing unit 203, and a control unit 204. The functional configuration illustrated in FIG. 12 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the communication device 20 may be the communication device 20A on the transmission side or the communication device 20B on the reception side.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The configuration information managing unit 203 stores pre-configured configuration information, configuration information received from the base station 10, and the like. The configuration information managing unit 203 may store different values applicable to the transmitting device 20 for one or more radio parameters among the numerology, the bandwidth part, and the slot length. Furthermore, configuration information related to transmission may be stored in the transmitting unit 201, and configuration information related to reception may be stored in the receiving unit 202. The control unit 204 controls the communication device 20. Furthermore, the function of the control unit 204 related to transmission may be included in the transmitting unit 201, and the function of the control unit 204 related to reception may be included in the receiving unit 202.

For example, in association with the operation described with reference to FIG. 10, the control unit 204 compares one or more combinations of radio parameters that are received from the communication device 20 on the transmission side by the receiving unit 202 and can be supported by the communication device 20 on the transmission side with one or more combinations of radio parameters that are stored in the configuration information managing unit 203 and can be supported by the communication device 20, and extracts one or more combinations of radio parameters that can be used for communication with the communication device 20 on the transmission side. The control unit 204 generates information indicating one or more extracted combinations of radio parameters, and the transmitting unit 201 transmits a signal including the generated information to the communication device 20 on the transmission side.

Furthermore, in the communication device 20 on the transmission side, the control unit 204 selects one or more combinations of radio parameters on the basis of the information indicating one or more combinations of radio parameters received from the communication device 20 of the reception side by the receiving unit 202 and applies it to data transmission to the communication device 20 on the reception side.

(Hardware Configuration)

In the block diagrams (FIGS. 15 and 16) used for the description of the embodiment, the blocks of the functional units are illustrated. The functional blocks (configuring units) are implemented by any combination of hardware and/or software. A device of implementing each functional block is not particularly limited. In other words, each functional block may be implemented by one device in which a plurality of elements is physically and/or logically combined or may be implemented by a plurality of devices, that is, two or more devices which are physically and/or logically separated and are directly and/or indirectly connected (for example, a wired and/or wireless manner).

Figure 17:
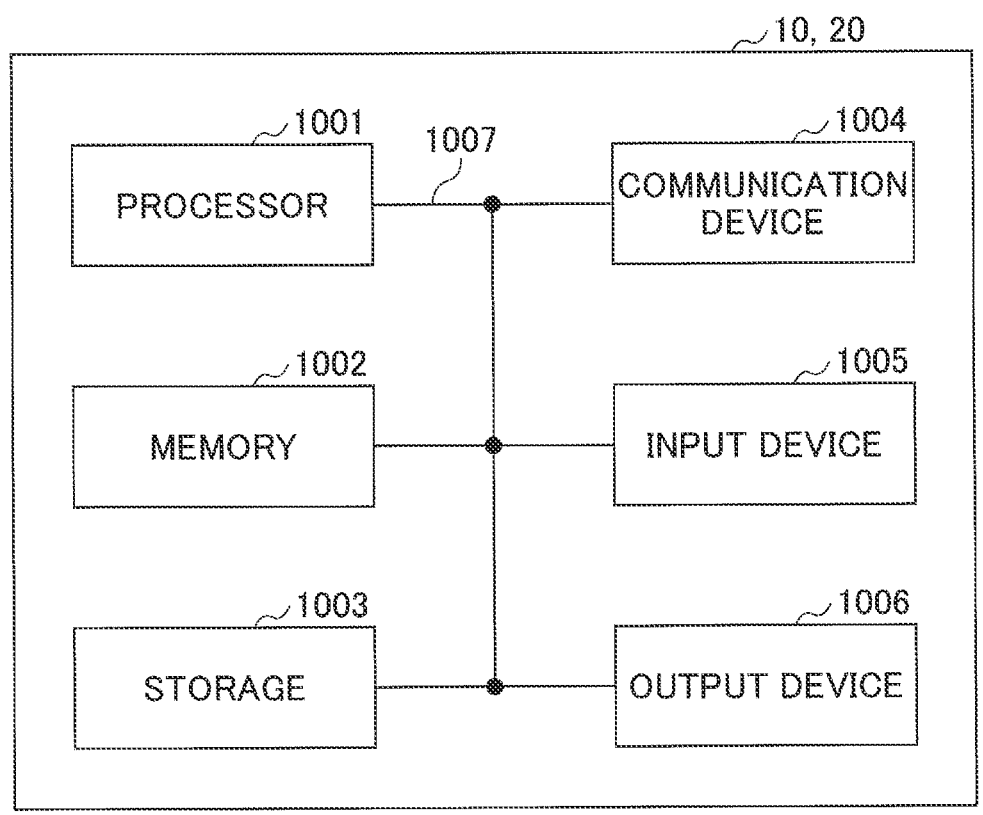
FIG. 17 is a diagram indicating an example of a hardware configuration of each of the base station 10 and the communication device 20 according to an embodiment.

Furthermore, for example, both the communication device 20 and the base station 10 in one embodiment of the present invention may function as a computer that performs the process according to the embodiments. FIG. 17 is a diagram illustrating an example of a hardware configuration of each of the communication device 20 and the base station 10 according to the embodiments. Each of the communication device 20 and the base station 10 may be physically configured as a computer device including a processor 1001, a memory 1002, a storage 1003, a communication device 1004, an input device 1005, an output device 1006, a bus 1007, and the like.

In the following description, the term "device" can be read as a circuit, device, unit, or the like. The hardware configuration of each of the communication device 20 and the base station 10 may be configured to include one or more devices indicated by 1001 to 1006 illustrated in the drawing or may be configured without including some devices.

Each function in each of the communication device 20 and the base station 10 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, or data from the storage 1003 and/or the communication device 1004 out to the memory 1002, and executes various types of processes according to them. A program causing a computer to execute at least some of the operations described in the above embodiment is used as the program. For example, the transmitting unit 101, the receiving unit 102, the configuration information managing unit 103, and the control unit 104 of the base station 10 illustrated in FIG. 15 may be implemented by a control program which is stored in the memory 1002 and operates on the processor 1001. The transmitting unit 201, the receiving unit 202, the configuration information managing unit 203, and the control unit 204 of the communication device 20 illustrated in FIG. 16 may be implemented by a control program which is stored in the memory 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present invention.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a "network device," a "network controller," a "network card," a "communication module," or the like. For example, the transmitting unit 201 and the receiving unit 202 of the communication device 20 may be implemented in the communication device 1004. Furthermore, the transmitting unit 101 and the receiving unit 102 of the base station 10 may be implemented in the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the memory 1002 are connected via the bus 1007 to communicate information with each other. The bus 1007 may be configured with a single bus or may be configured with different buses between the devices.

Furthermore, each of the communication device 20 and the base station 10 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Conclusion of the Embodiments

In this specification, at least the communication device described below is disclosed.

A communication device includes a receiving unit that receives information indicating a first set of combinations of radio parameters; a control unit that extracts, based on the first set of the combinations of the radio parameters and a second set of combinations of radio parameters supported by the communication device, a third set of combinations of radio parameters that are common between the first set and the second set; and a transmitting unit that transmits information indicating the third set of the combinations of the radio parameters.

According to the above-described configuration, the transmitting device at the reception side can extract a third set of combinations of radio parameters that are common between a first set of combinations of radio parameters supported by the communication device at the transmission side that is received from the communication device at the transmission side and a second set of combinations of radio parameters supported by the communication device at the reception side, and can transmit information indicating the third set to the communication device at the transmission side. Accordingly, the communication device at the transmission side can select, from the received third set, a combination of radio parameters that can be used for the communication device at the transmission side and the communication device at the reception side.

The receiving unit may receive one or more indexes indicating one or more combinations of radio parameters selected from the third set of the combinations of the radio parameters, and the control unit may configure the receiving unit with one or more radio parameters specified by the received one or more indexes.

According to the above-described configuration, since the communication device at the transmission side transmits an index indicating a combination of radio parameters selected for data transmission to the communication device at the reception side, the communication device at the reception side can configure, for data reception, a combination of radio parameters corresponding to the combination of the radio parameters that are selected by the communication device at the transmission side for data transmission, based on the received index.

The control unit may configure the receiving unit with the combinations of the radio parameters of the third set of the combinations of the radio parameters, and the receiving unit may attempt to receive data with the configured combinations of the radio parameters.

According to the above-described configuration, since the communication device at the reception side performs blind reception using the third set of the combinations of the radio parameters, it is not necessary for the communication device at the transmission side to transmit, to the communication device at the reception side, the combination of the radio parameters that are finally applied. Accordingly, the overhead can be reduced.

The control unit may extract a set of radio parameters assigned with a highest priority level in the third set of the combinations of the radio parameters based on priority levels assigned to respective combinations of radio parameters in the third set of the combinations of the radio parameters, and the transmitting unit may transmit an index indicating the set of the radio parameters assigned with the highest priority level.

According to the above-described configuration, for example, by assigning priority levels to the combinations of the radio parameters in ascending order of an amount of latency in data communication, latency in sidelink data communication can be reduced.

A communication device includes a receiving unit that receives information indicating a first set of combinations of radio parameters; a control unit that extracts, by comparing the first set of the combinations of the radio parameters with a second set of combinations of radio parameters supported by the communication device, one or more combinations of radio parameters that are common between the first set and the second set; and a transmitter that transmits data by applying the extracted one or more combinations of the radio parameters.

According to the above-described configuration, the communication device at the transmission side of the data transmission can select a combination of radio parameters that can be used for the communication device at the transmission side and the communication device at the reception side, and the communication device at the transmission side can apply the selected combination to the data transmission.

A base station apparatus includes a receiving unit that receives information indicating a first set of combinations of radio parameters supported by a first communication device and information indicating a second set of combinations of radio parameters supported by a second communication device; a control unit that extracts, by comparing the first set of the combinations of the radio parameters with the second set of the combinations of the radio parameters, a third set of combinations of radio parameters that are common between the first set and the second set; and a transmitting unit that transmits information indicating the third set of the combinations of the radio parameters.

According to the above-described configuration, the base station can select a combination of radio parameters that can be used for the communication device at the transmission side of the data transmission and the communication device at the reception side, and the base station can transmit the selected combination to the communication device at the transmission side and the communication device at the reception side.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the communication device 20 and the base station 10 have been described using the functional block diagrams, but such devices may be implemented by hardware, software, or a combination thereof. Software executed by the processor included in the communication device 20 according to the embodiment of the present invention and software executed by the processor included in the base station 10 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Although the embodiments are assumed to be mainly applied to the sidelink communication, the embodiments are not limited to sidelink but may be applied to DL/UL of cellular communication. In the embodiments, the numerology, the bandwidth part, and the slot length are described as a combination of radio parameters specifying an SL capability and a UE capability, but the combination of radio parameters is not limited thereto. For example, a notification indicating whether or not a mini-slot is supported, a corresponding format of dynamic TDD, whether or not a short/long PUCCH is supported, whether or not multilayer transmission of SL is supported (including information of a maximum of the number of layers and/or the number of ports), waveform (CP-OFDM/DFT-S-OFDM), or the like may be given, or a combination to be applied among one or more combinations of radio parameters may be selected.

A notification of information is not limited to the aspect or embodiment described in this specification and may be given by any other method. For example, the notification of information may be given physical layer signaling (for example, downlink control information (DCI), uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an "RRC message" and may be, for example, an RRC connection setup message, an RRC connection reconfiguration message, or the like.

Each aspect and embodiment described in this specification is applicable to Long Term Evolution (LTE), LTE-Advanced (LTE-A), SUPER 3G, IMT-Advanced, 4G, 5G, NR, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In this specification, a specific action that is supposed to be performed by the base station 10 may be performed by an upper node in some cases. In the network including one or more network nodes including the base station 10, various operations performed for communication with the communication device 20 can be obviously performed by the base station 10 and/or any network node (for example, an MME, an S-GW, or the like is considered, but it is not limited thereto) other than the base station 10. The example in which the number of network nodes excluding the base station 10 is one has been described above, but a combination of a plurality of other network nodes (for example, an MME and an S-GW) may be provided.

Each aspect/embodiment described in this specification may be used alone, may be used in combination, or may be switched in association with execution.

The communication device 20 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, depending on those having skill in the art.

The base station 10 is also referred to as a Node B (NB)), an enhanced Node B (eNB), a base station, a gNB, or other appropriate terms, depending on those having skill in the art.

The term "determining" used in this specification may include a wide variety of actions. For example, "determining" may include, for example, events in which events such as judging, calculating, computing, processing, deriving, investigating, looking up (for example, looking up in a table, a database, or another data structure), or ascertaining are regarded as "determining." Furthermore, "determining" may include, for example, events in which events such as receiving (for example, receiving information), transmitting (for example, transmitting information), input, output, or accessing (for example, accessing data in a memory) are regarded as "determining." Furthermore, "determining" may include, for example, events in which events such as resolving, selecting, choosing, establishing, or comparing are regarded as "determining." In other words, "determining" may include events in which a certain operation is regarded as "determining."

A phrase "on the basis of" used in this specification is not limited to "on the basis of only" unless otherwise stated. In other words, a phrase "on the basis of" means both "on the basis of only" and "on the basis of at least."

"Include," "including," and variations thereof are intended to be comprehensive, similarly to a term "equipped with (comprising)" as long as the terms are used in this specification or claims set forth below. Furthermore, the term "or" used in this specification or claims set forth below is intended not to be an exclusive disjunction.

In the present disclosure, for example, when an article such as "a," "an," or "the" in English is added by a translation, such an article is assumed to include the plural unless it is obviously indicated that such an article does not include the plural.

The terms "selecting" and "extracting" used in this specification may include a wide variety of actions. For example, "selecting" and "extracting" may include, for example, events in which events such as judging, calculating, calculating, computing, processing, deriving, investigating, looking up (for example, looking up in a table, a database, or another data structure), or ascertaining are regarded as "determining." Furthermore, "selecting" and "extracting" may include, for example, events in which events such as receiving (for example, receiving information), transmitting (for example, transmitting information), input, output, or accessing (for example, accessing data in a memory) are regarded as "selecting" and "extracting." Furthermore, "selecting" and "extracting" may include, for example, events in which events such as resolving, selecting, choosing, establishing, or comparing are regarded as "selecting" and "extracting." In other words, "selecting" and "extracting" may include events in which a certain operation is regarded as "selecting" and "extracting."

Although the present invention has been described above in detail, it is obvious to those having skill in the art that the present invention is not limited to the embodiments described in this specification. The present invention can be carried out as revisions and modifications without departing from the gist and scope of the present invention defined by the claims set forth below. Accordingly, the description of this specification is intended to be exemplary and does not have any restrictive meaning to the present invention.

LIST OF REFERENCE SYMBOLS 101 transmitting unit
102 receiving unit
103 configuration information managing unit
104 control unit
201 transmitting unit
202 receiving unit
203 configuration information managing unit
204 control unit
1001 processor
1002 memory
1003 storage
1004 communication device
1005 input device
1006 output device

The invention claimed is:

1. A communication device comprising:
   a receiver that receives information including a first set of radio parameters;
   a processor that derives, from the first set of radio parameters, a second set of radio parameters supported by the communication device; and
   a transmitter that transmits information including one or more radio parameters included in the second set of radio parameters,
   wherein the processor includes a subcarrier spacing and a cyclic prefix supported by the communication device in the information including the one or more radio parameters transmitted by the transmitter.

2. The communication device of claim 1, wherein the processor receives data based on the one or more radio parameters transmitted by the transmitter.

3. A communication method by a communication device comprising:
   receiving information including a first set of radio parameters;
   deriving, from the first set of radio parameters, a second set of radio parameters supported by the communication device; and
   transmitting information including one or more radio parameters included in the second set of radio parameters,
   wherein a subcarrier spacing and a cyclic prefix supported by the communication device are included in the information including the one or more radio parameters.

4. A system comprising:
   a communication device including:
     a receiver that receives information including a first set of radio parameters;
     a processor that derives, from the first set of radio parameters, a second set of radio parameters supported by the communication device; and
     a transmitter that transmits information including one or more radio parameters included in the second set of radio parameters, and that transmits UE capability to a base station,
     wherein the communication device includes a subcarrier spacing and a cyclic prefix supported by the communication device in the information including the one or more radio parameters transmitted by the transmitter; and
   a base station that receives the UE capability transmitted from the communication device.

* * * * *